United States Patent
Lang et al.

(10) Patent No.: US 7,782,223 B2
(45) Date of Patent: Aug. 24, 2010

(54) FLASHING FLARE WARNING DEVICE

(76) Inventors: Steve Lang, 1619 E. 818 Rd., Lawrence, KS (US) 66049; Barry Siskind, #3 Moss Springs Ct., Henderson, NV (US) 89052

( * ) Notice: Subject to any disclaimer, the term of this patent is extended or adjusted under 35 U.S.C. 154(b) by 219 days.

(21) Appl. No.: 11/891,389

(22) Filed: Aug. 10, 2007

(65) Prior Publication Data

US 2008/0036584 A1    Feb. 14, 2008

Related U.S. Application Data

(60) Provisional application No. 60/838,534, filed on Aug. 11, 2006.

(51) Int. Cl.
| G08B 5/22 | (2006.01) |
| B60Q 1/26 | (2006.01) |
| B60Q 7/00 | (2006.01) |
| F21L 4/00 | (2006.01) |
| F21L 19/00 | (2006.01) |
| F21L 13/00 | (2006.01) |
| F21V 21/00 | (2006.01) |
| H02J 7/00 | (2006.01) |

(52) U.S. Cl. .................. 340/815.45; 340/468; 340/473; 340/815.46; 340/908; 362/157; 362/171; 362/202; 362/249.01; 362/249.1; 362/577; 362/611; 362/615; 362/623; 362/183; 320/107; 320/114; 320/115

(58) Field of Classification Search .................. 340/468, 340/473, 815.45, 908; 362/157, 171, 202, 362/249.01, 249.1, 577, 611, 615, 623, 183, 362/184
See application file for complete search history.

(56) References Cited

U.S. PATENT DOCUMENTS

| 5,806,965 | A | * | 9/1998 | Deese | 362/249.04 |
| 5,931,560 | A | * | 8/1999 | Hoffman | 362/124 |
| 6,206,541 | B1 | * | 3/2001 | Landamia | 362/184 |
| 6,206,542 | B1 | * | 3/2001 | Case et al. | 362/190 |
| 6,265,969 | B1 | * | 7/2001 | Shih | 340/468 |
| 6,469,631 | B1 | * | 10/2002 | Pederson | 340/815.45 |
| 6,472,996 | B1 | * | 10/2002 | Pederson | 340/815.45 |
| 6,637,904 | B2 | * | 10/2003 | Hernandez | 362/8 |
| 6,788,217 | B2 | * | 9/2004 | Pederson | 340/815.45 |
| 6,819,080 | B2 | * | 11/2004 | Barbeau et al. | 320/107 |
| 6,899,441 | B2 | * | 5/2005 | Chen | 362/102 |
| 7,270,579 | B2 | * | 9/2007 | Bhavnani | 439/638 |
| 7,296,909 | B2 | * | 11/2007 | Van Deursen et al. | 362/199 |
| 7,325,944 | B2 | * | 2/2008 | Kovacik et al. | 362/249.12 |
| 7,338,189 | B2 | * | 3/2008 | Kovacik et al. | 362/398 |

* cited by examiner

Primary Examiner—Benjamin C Lee
Assistant Examiner—Lam P Pham
(74) Attorney, Agent, or Firm—Polsinelli Shughart, PC; Richard P. Stitt

(57) ABSTRACT

A light emitting diode warning device is provided capable of acting as a roadway warning flare or as a flashing warning marker the device being portable and rechargeable and presenting warning lights in the vertical direction and in the horizontal direction with the horizontal illumination being observable over 360 degrees.

3 Claims, 6 Drawing Sheets

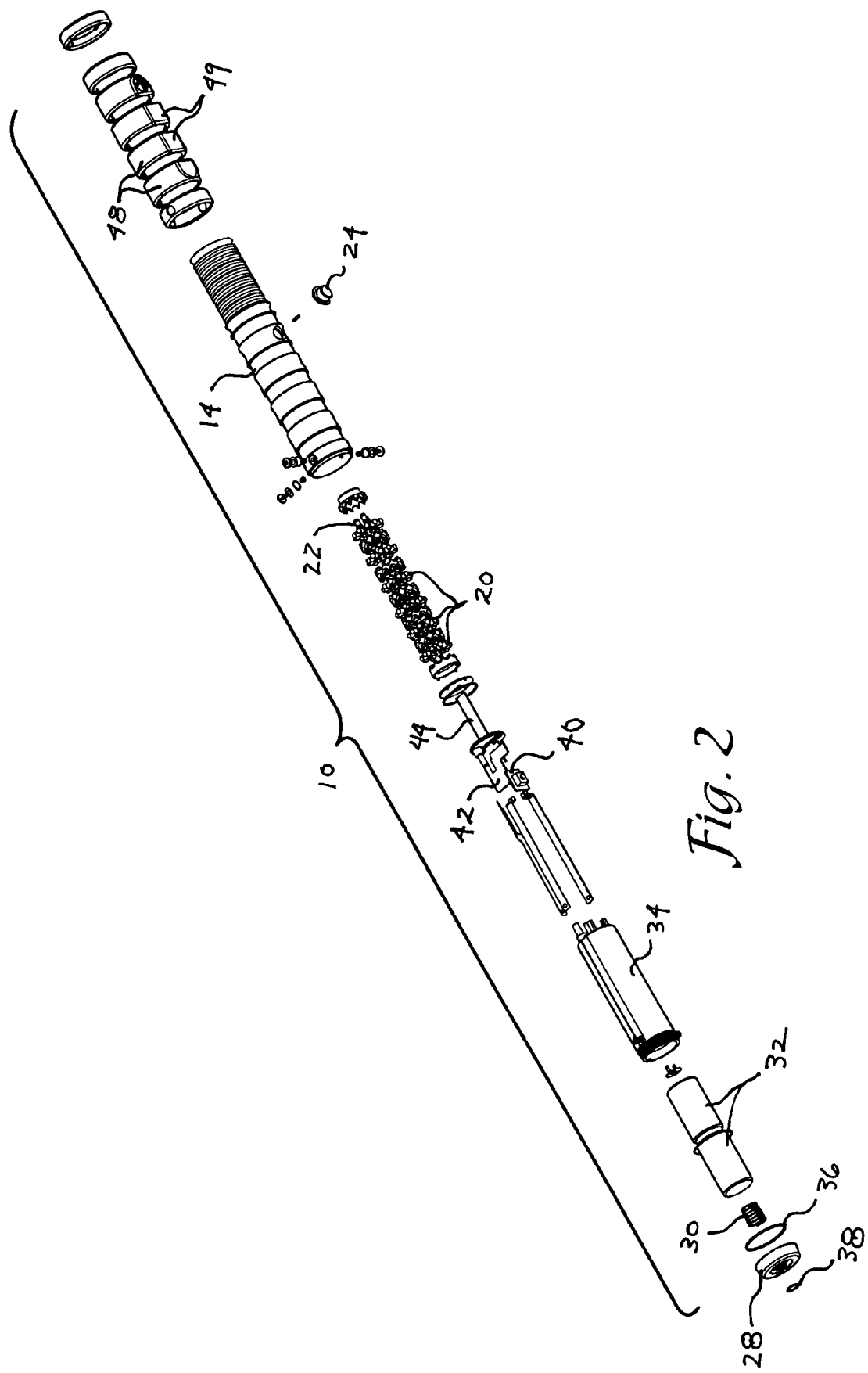

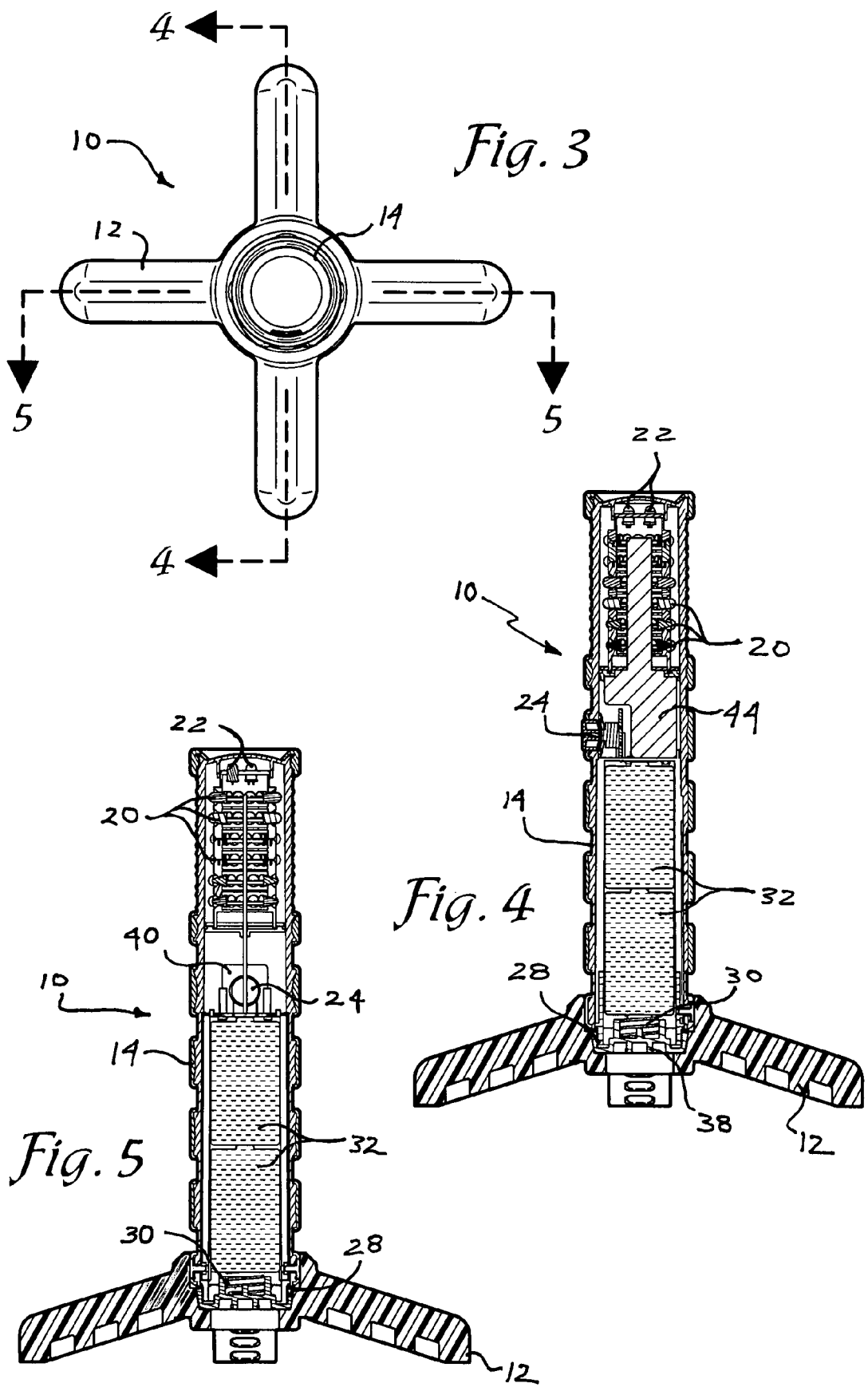

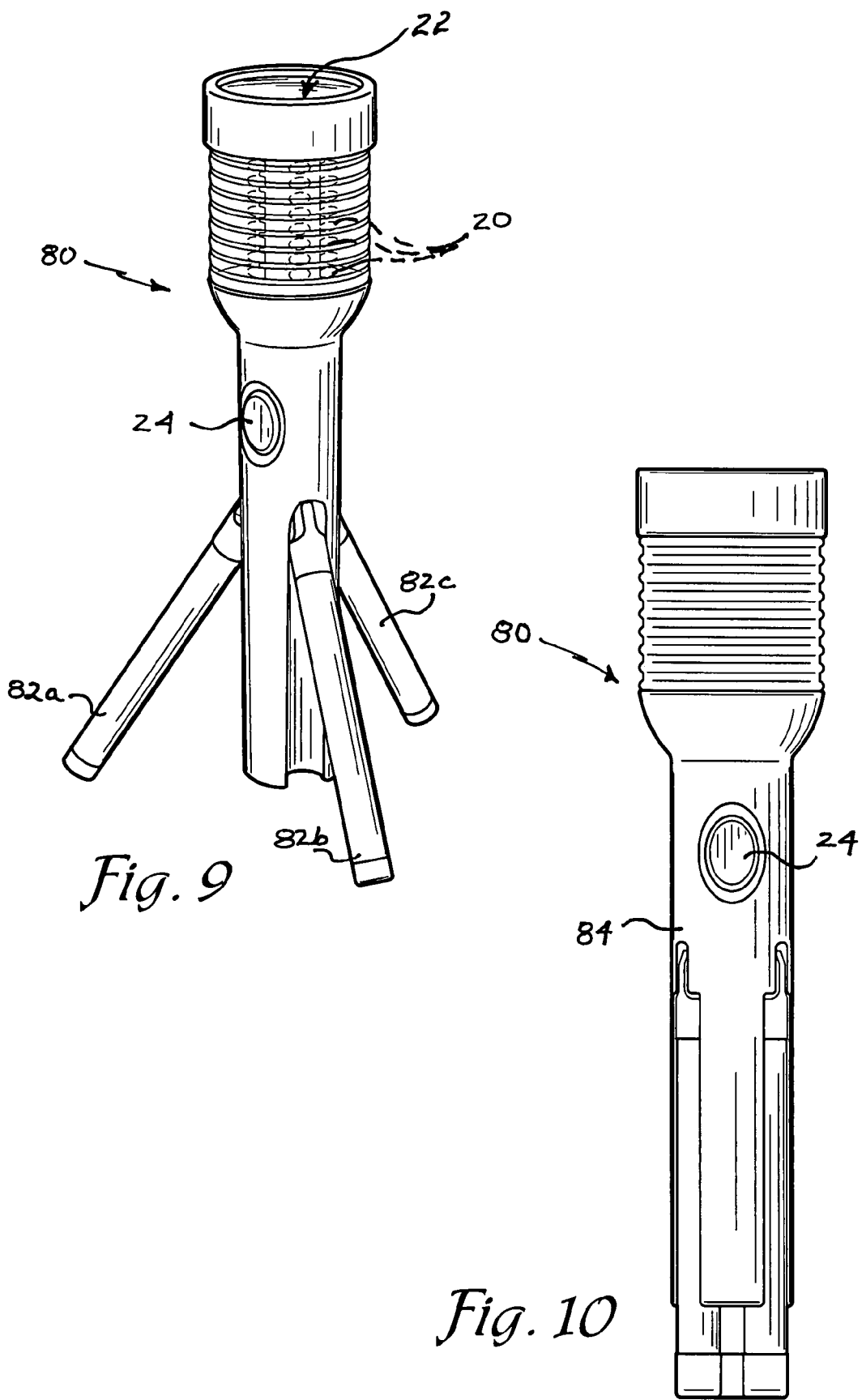

US 7,782,223 B2

FLASHING FLARE WARNING DEVICE

CROSS REFERENCE TO RELATED APPLICATION

This application claims priority under 35 U.S.C. 119(e) and 37 C.F.R. 1.78(a)(4) based upon copending U.S. Provisional Application Ser. No. 60/838,534 for Flashing Flare Pro Device filed Aug. 11, 2006 and which is incorporated herein by reference.

FIELD OF THE INVENTION

The present invention relates to warning devices generally and in particular roadway or traffic warning devices. A light emitting diode (LED) warning device is provided which generally is a substitute for all uses for which a prior art burning chemical-based flare was applicable. The LED warning device or "flare" provides 360 degree illumination in a horizontal direction as well as LEDs aimed vertically for presenting a warning light in a vertical direction or for use in marking a landing area for a helicopter.

BACKGROUND OF THE INVENTION

During traffic emergencies and other signaling, emergency workers, including police and fire departments, typically use combustible road flares to serve as warning devices in the vicinity of traffic accidents and other emergency situations. Typical road flares are comprised of a combination of strontium nitrate and one or more of the following compounds: potassium nitrate, sulfur, potassium perchlorate and a variety of other compounds. The flare may include a striker mechanism on the order of that used with a typical "strike anywhere match" to start the product burning. Many of the unfortunate side products of the use of road flares of this design is that they are a hot burning mass of solid chemical compound, and as such, can lead to burns of the personnel using them and damage to clothing equipment associated with the persons using the equipment. Further, such flammable road flares create a mess on the roads, and when it is desired to extinguish the road flares, they must be kicked or smothered in some fashion to break apart the burning segment from the remainder of the flare to quickly extinguish the flare. This, again, can lead to damage to shoes, boots, and other clothing. Therefore, the common flammable road flare is, at a minimum, a nuisance to those who use it, and a non-flammable road flare would be of great utility. Further, for police departments and fire departments and other emergency units, the cost of flammable road flares each year is a significant expense, and it would be preferable to minimize this expense.

Such elimination of flammable road flare and the damage and expense associated with it is provided by the present invention which comprises a rechargeable LED flashing, and non-flashing unit, which may be recharged for repeated use. The present invention also may be positioned within a base to serve as a fixed position road flare, or the invention may be removed from the base and hand-held to use as a signal for directing traffic and the like during emergency situations. In addition, the present invention also includes, in one embodiment, LEDs on the top end of the device which are aimed upwardly. The device, when inserted into a base, can be used to serve as landing lights to assist in the landing of helicopters. This latter feature is particularly useful at rural traffic accident scenes or other rural areas when it is desired to use a helicopter to medically evacuate an injured person.

SUMMARY OF THE INVENTION

A warning-marking device is provided having LED illumination in the vertical direction and/or 360 degrees of illumination in the horizontal direction. The warning device uses LEDs for illumination instead of the burning chemical material of prior art warning flares. The warning device LEDs can be selected to illuminate in the vertical and/or the horizontal directions. The warning device is comprised of a warning device and a support base for receiving the warning device and retaining the warning device in an upright position. The warning device is battery operated and is provided with a housing that may be connected into the electrical system of a motor vehicle to permit recharging of the batteries in the warning device. An alternate embodiment of the warning device is provided having retractable legs which can be used to support the warning device apart from the separable base. When the legs are in the retracted position the warning device can be used in the manner of a flashlight with the LEDs mounted in the top end functioning as the illumination source. A collapsible base also is provided having a pair of opposed legs extending radially from a central pivot, the pair of legs each being separable into two legs for pivotally spacing apart by pivoting of the legs about the central pivot which also is used to support a warning device therein.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of the invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

FIG. 2 is an exploded view of the embodiment of FIG. 1 with the base excluded for clarity;

FIG. 3 is a top plan view of the embodiment of FIG. 1;

FIG. 4 is a cross section view of the embodiment of FIG. 1 taken along line 4-4 of FIG. 3;

FIG. 5 is a cross section view of the embodiment of FIG. 1 taken along line 5-5 of FIG. 3;

FIG. 9 is side elevation view of an alternate embodiment of the warning device having expandable and retractable legs for supporting the embodiment; and FIG. 10 is side elevation view of the embodiment of FIG. 9 showing the legs in the retracted position allowing use of the vertical LEDs in the manner of a flashlight.

DESCRIPTION OF THE PREFERRED EMBODIMENT

As required, detailed embodiments of the present inventions are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
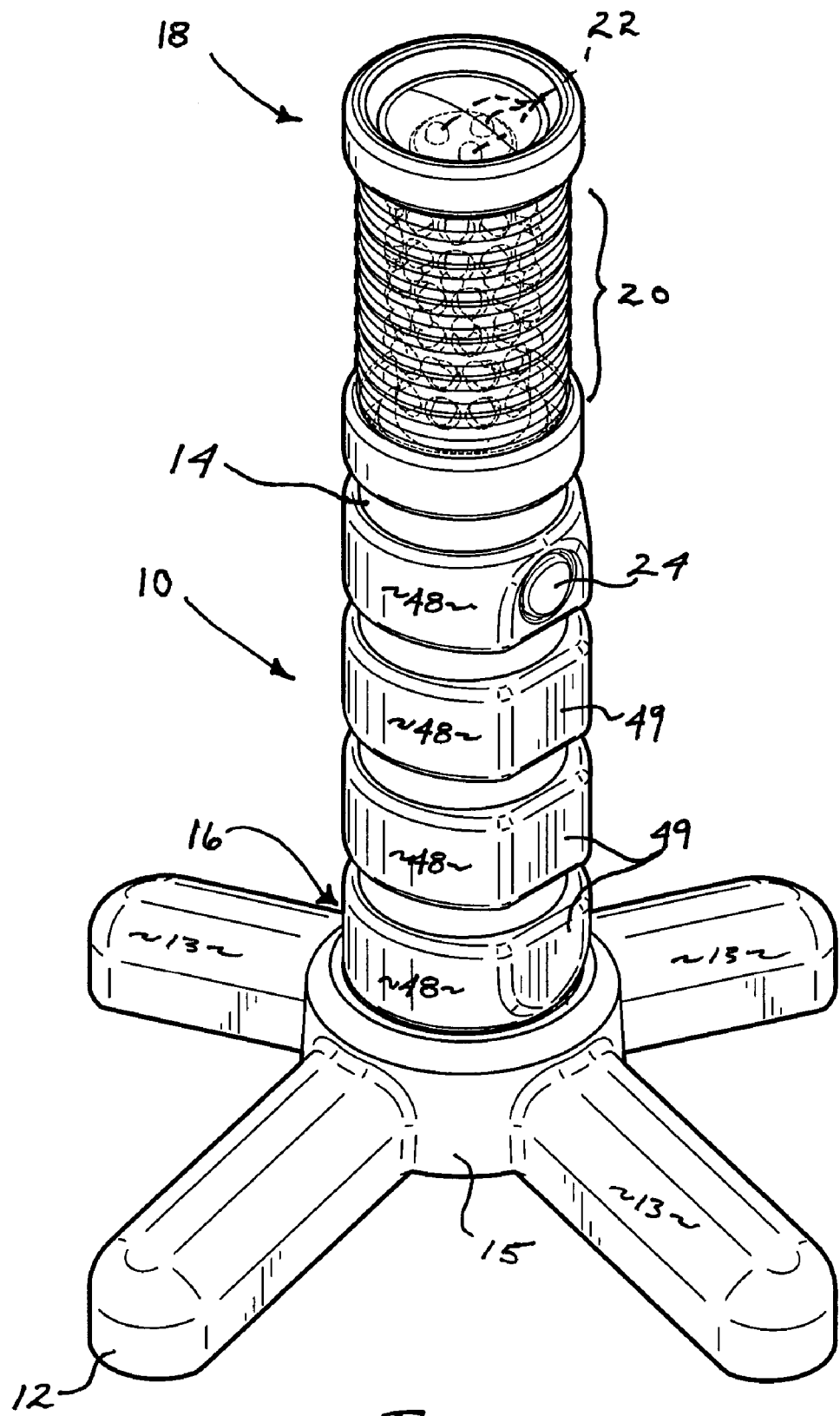
FIG. 1 is a top and side elevation view of an embodiment of the warning device mounted in a base and showing a flat side portion to prevent rolling of the warning device when demounted from the base and showing the activation switch and the vertically aimed LEDs and the horizontally aimed LEDs.

FIG. 1 shows an embodiment of warning device 10 seated in a base 12 so the device 10 could be placed on a roadway for alerting motorists or used for some other fixed location use. In FIG. 1 the general construction of the warning device 10 may be seen and comprises base 12 for receiving warning device 10. Warning device 10 has a columnar body 14 with a first end 16 seated in base 12 and a second end 18 containing first LED lights directed horizontally 20 and second LED lights directed vertically 22 as body 14 is supported in base 12. Switch 24 is positioned on body 14 and is a multi-function switch. Switch 24 allows the first and second LED lights to be switched on and off and also switched between being constantly illuminated and intermittently illuminated or flashing on and off.

Referring now to FIG. 2, the embodiment of FIG. 1 is shown in exploded view. In FIG. 2 base 12 used to support the warning device is not shown. At a first end 16, battery cap 28 has seated therein battery contact 30 for electrical contact with batteries 32 which are insertable into battery holder 34. Battery cap 28 connects to battery holder 34 with rubber ring 36 therebetween to exclude moisture from the interior of battery holder 34. Battery contact 30 extends through cap 28 to make electrical contact with recharger contact plate 38. Contact plate 38 is positioned on the opposite side of battery cap 28 and provides recharge contact when the warning device 10 is inserted into a recharger holder (FIG. 6) to maintain batteries 32 in an energized state. Thus, contacts 30, 38 connect a power source to the batteries 32 inserted into battery holder 34 of device 10. The warning device 10 may be turned on and off using switch 24 which is connected to power switch printed circuit board 40. Main printed circuit board 42 is adjacent LED printed circuit boards 44 which have forty 5 millimeter LEDs 20, 22 connected to LED circuit boards 44. The entirety of the previously described unit is insertable within main columnar body 14 to complete the construction of the warning device 10.

Again referring to FIG. 1, various components of the warning device are shown such as a rain, snow, sun and salt and water resistant base 12 for supporting the warning device 10. Base 12 is provided with a plurality of radially extending legs 13 that are connected to receiver 15 into which lower end 16 of body 14 can be secures by frictional fit. Flattened surfaces 49 of body 14 prevents rolling if the flare and base unit is inadvertently tipped over. The warning device 10 is insertable and removable from base 12. Columnar body 14 further is comprised of reflective exterior body bands 48 which also serve as a handle grip. Bands 48 typically are colored a bright, florescent, warning color such as orange to better attract attention. The light source is provided by a plurality of circumferential bands of high-intensity LEDs which are distributed about the circumference or second end of the generally cylindrically or columnar body 14 of the warning device 10. A plurality of such bands of LEDs are spaced longitudinally apart along a segment of the columnar body 14. The top end 18 of the cylinder 14 that is opposite from first end 16 that is inserted into the base 12 is provided with vertically pointed LEDs for directing helicopter landings. In FIG. 1, warning device 10 is shown inserted into base 12. As may be appreciated in FIG. 6, the warning device 10 is removable from base 12 and may be held in the hand for mobile duty and used in directing traffic or shining illumination onto an area. Warning device 10 generally is formed of a plastic body, such as a clear, plastic polycarbonate which is injection molded. The body is then over-molded with a brightly colored bands 48 which are, in a preferred embodiment, a florescent orange, to assist in calling attention to the device. The over-molded surface or bands 48 are textured to assist in gripping the device 10. In an alternate embodiment, the over-molded florescent, brightly colored plastic may be spaced farther apart, and a differently colored reflective tape would be inserted between the brightly colored florescent portions to better attract attention to the device.

Figure 6:
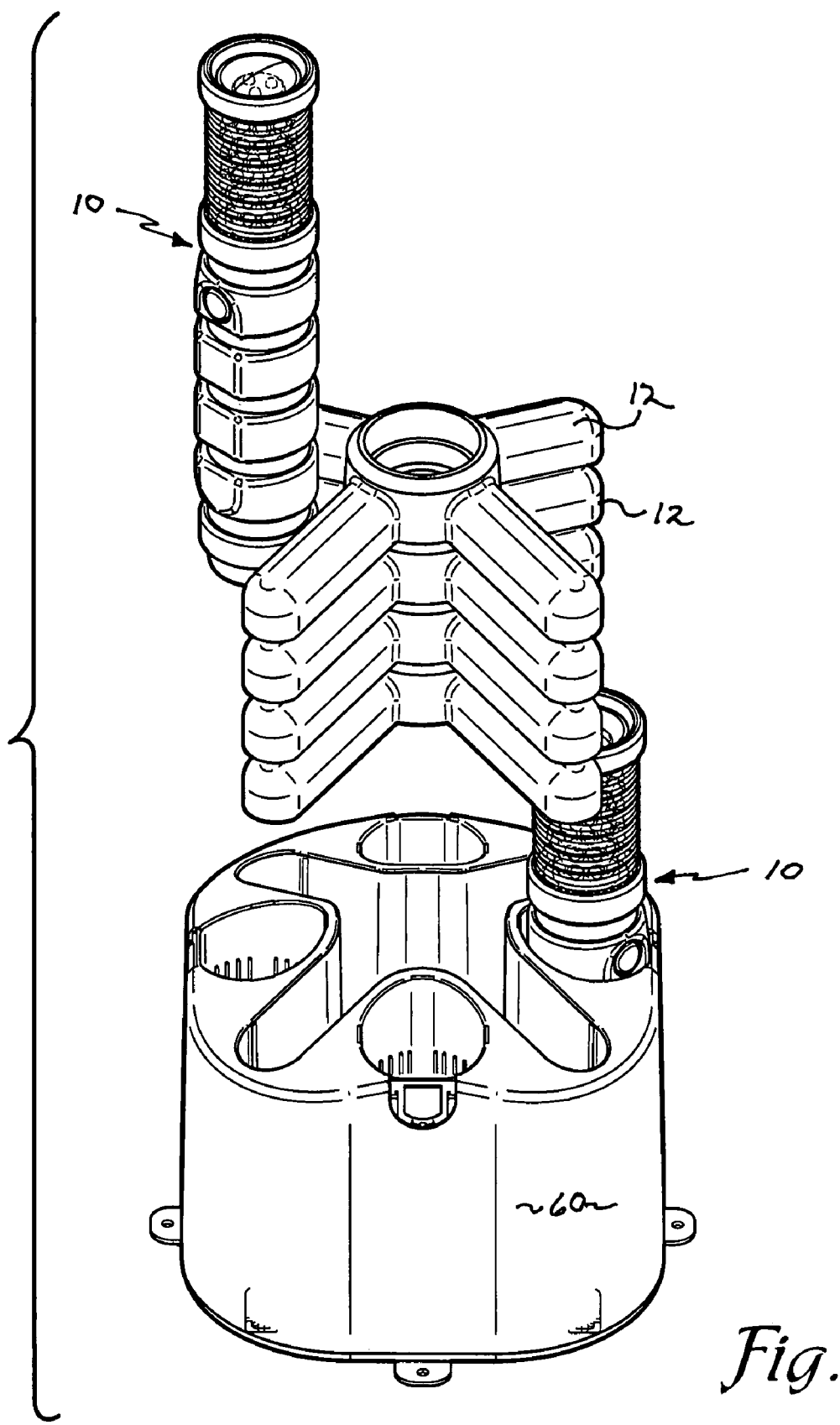
FIG. 6 is a top and side exploded view of an embodiment in which multiple warning device units have been disassembled into a plurality of bases and a plurality of warning devices and showing one warning device inserted into a carrier housing for carrying and recharging the warning devices and one warning device and a plurality of bases in position for insertion into the housing.

Referring now to FIG. 6, two warning devices 10 and four bases 12 are shown in exploded view proximate to a holder 60 to allow for convenient transportation and storage of multiple devices 10 in the trunk of a vehicle or other location. In FIG. 6, holder 60 is a recharging base unit which also may serve as a carrying unit. It will be appreciated that holder 60 operates as a trickle charger-type unit to assist in keeping batteries 32 (FIG. 2) of warning devices 10 at peak charge while minimizing recharging damage to the rechargeable batteries. It will be appreciated that holder or recharging unit 60 is provided with contacts 62 (not shown) for engagement with contacts 38 on end 16 of warning devices 10 to allow recharging of the rechargeable batteries 32 within the warning devices 10. It will be appreciated that holder 60 is provided with a power cord for connection of holder 60 to the electrical system of a vehicle or the electrical system of a building so a power source can be supplied to holder 60.

Still referring to FIG. 6, one warning devices 10 is shown seated within holder 60 for recharging and four individual, removable bases 12 are shown stacked together for insertion into holder 60. It will be appreciated that when needed for use each of bases 12 stacked in holder 60 can be removed for use with one of warning devices 10.

Referring now to FIG. 4, a cross section view of warning device 10 taken along line 4-4 of FIG. 3 is shown. The connection between batteries 32 and connectors 30, 38 are shown extending through cap 28 permitting electrical contact between an external power source and batteries 32. LED circuit board 44 is shown connecting to LEDs 20 which are arranged in circumferential array around second end 18 of columnar body 14 of warning device 10. Second LED lights 22 which are directed vertically or directed along the longitudinal axis of columnar body 14 are shown positioned above first LED lights 20.

Referring now to FIG. 5, a cross section view of warning device 10 taken along line 5-5 of FIG. 3 is shown. Power switch printed circuit board 40 is shown connected to switch 24 and provides selection of the various illumination alternatives offered by warning device 10. These illumination alternatives include all LEDs on, all LEDs off, circumferential LED bands 20 on or flashing, and vertically or longitudinally oriented LEDs 22 on or flashing.

Figure 7:
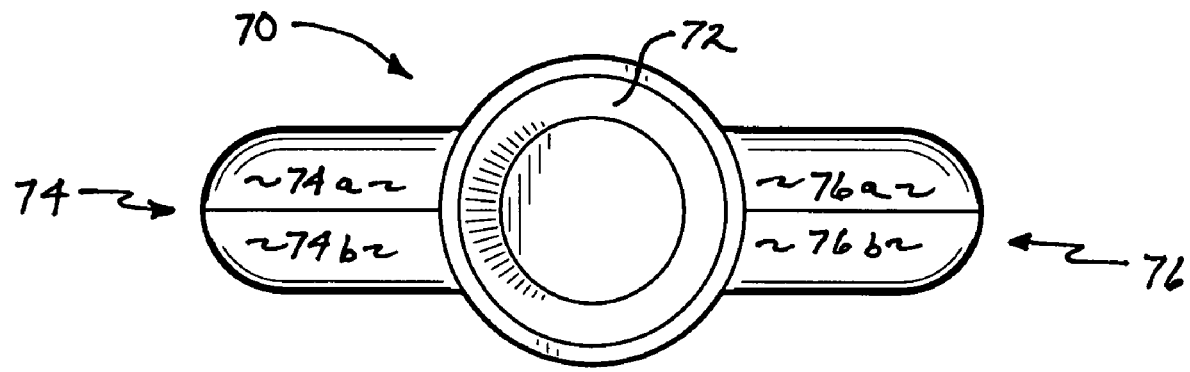
FIG. 7 is a top plan view of an alternate embodiment of a base for supporting a warning device the alternate base having legs that are rotatably separable and collapsible between first and second positions and showing in FIG. 7 the collapsed position of two opposed legs.
Figure 8:
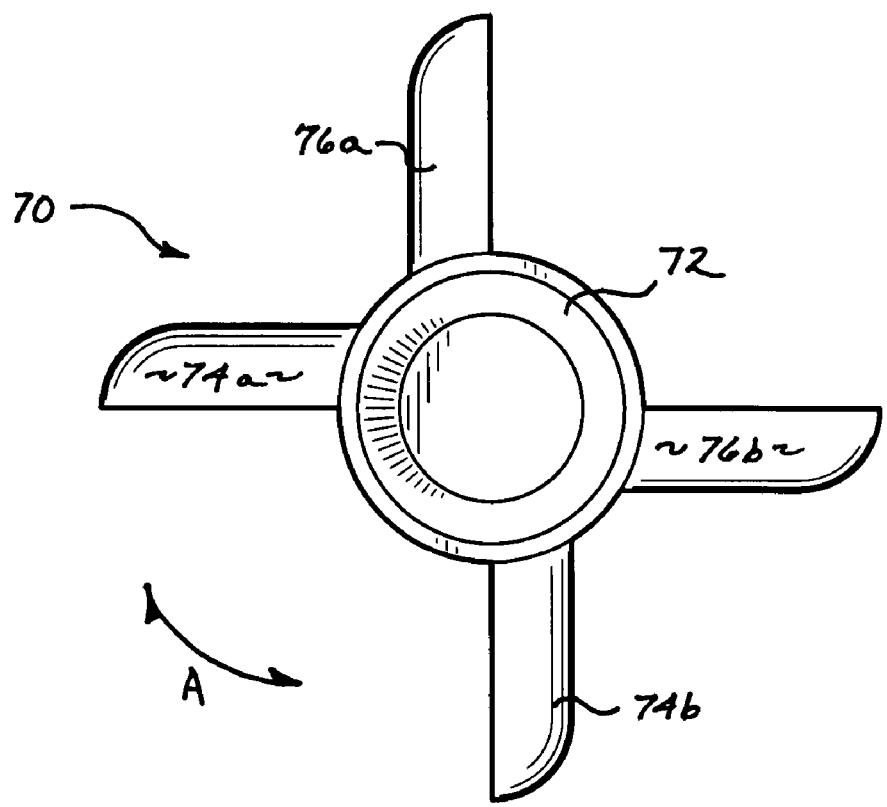
FIG. 8 is a top plan view of the embodiment of FIG. 7 showing the legs separated to provide four spaced apart legs.

Referring now to FIG. 7, an alternative embodiment of a support base 70 for warning device 10 is shown. Base 70 is a collapsible base which allows for more convenient storage of the base. In FIG. 7, base 70 is in its first or collapsed position in which leg 74, 76 extend from receiver 72 in diametrically opposed fashion. It will be appreciated that leg 74, 76 are of a split construction with one half of each leg 74, 76 rotatably mounted on receiver 72. As shown in FIG. 8, leg halves 74b, 76a may be rotated in the direction indicated by Arrow "A" about receiver 72 to provide four spaced apart legs extending from receiver 72.

Referring now to FIGS. 9 and 10, an alternate embodiment of warning device 10 is shown. The warning device 80 of FIGS. 9 and 10 is similarly constructed to the embodiment described in FIGS. 1-5. The embodiment of FIGS. 9 and 10 is configured to function as both a free standing warning device and as a hand held flashlight-type device. Warning device 80 is provided with extendable and collapsible legs 82a, 82b, 82c. As shown in FIG. 9, extendable legs 82a, 82b, 82c can be pulled outwardly from body 84 of device 80 to provide a tripod stand for holding device 80 in an upright position. Alternatively, as shown in FIG. 10, legs 82a, 82b, 82c can be collapsed against body 84 to allow device 80 to be held in the manner of a flashlight and used for a warning device or used in the manner of a flashlight.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive warning device and housing and base embodiments are constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A warning marker kit comprising:
   a plurality of warning markers each marker comprising:
      a generally cylindrical body having a lower end and an upper end,
      at least one LED in said upper end for emitting light in a direction generally coaxial to a longitudinal axis of said cylindrical body,
      a plurality of circumferential bands of LEDs said bands spaced longitudinally on said body, each of said bands comprised of a plurality of LEDs circumferentially spaced about said body,
      a battery connected to said body to power the LEDs,
   a plurality of bases for supporting each of said markers, each of said bases having a receiver for frictional fit of a marker body lower end therein and a plurality of spaced apart legs radially extending from said receiver, said body being insertable into said base for frictional capture therein, and
   a housing comprising a plurality of receptacles each receptacle adapted to receive therein one of said plurality of warning markers, electrical contacts in each of said receptacles for contacting electrical contacts on a marker received in said receptacle having a recharging base for receiving each of said plurality of markers, said housing further comprising a holder for receiving said plurality of bases therein.

2. The kit as claimed in claim 1 further comprising a power cable extending from said housing for connection to an electrical system to charge said battery.

3. The apparatus as claimed in claim 1 wherein each of said bases further comprises:
   a pair of opposed legs extending bilaterally from said receiver,
   each of said pair of legs being split longitudinally into first and second leg portions, said first leg portions of each of said pair of legs being rotatable about said receiver between a closed position in which said first and second leg portions are in contact and an open position in which said first and second leg portions are spaced apart.

* * * * *